United States Patent
Strohmer et al.

[15] 3,688,704
[45] Sept. 5, 1972

[54] CURVE RESPONSIVE TILT CONTROL DEVICE

[72] Inventors: Alfred Strohmer; Joachim Rau, both of Munich, Germany

[73] Assignee: Knorr-Bremse GmbH, Germany

[22] Filed: Jan. 26, 1971

[21] Appl. No.: 109,897

[30] Foreign Application Priority Data

Jan. 26, 1970 Germany..........P 20 03 385.6

[52] U.S. Cl..............................105/453, 280/112 A
[51] Int. Cl.............................................B60g 21/06
[58] Field of Search....105/453, 164; 280/112 A, 124

[56] References Cited

UNITED STATES PATENTS 2,960,349   11/1960   Vogel.....................280/112 A

*Primary Examiner*—Drayton E. Hoffman
*Assistant Examiner*—George H. Libman
*Attorney*—Edmund M. Jaskiewicz

[57] ABSTRACT

Control signals are generated from a gyroscope in response to the curvilinear movement of the vehicle corresponding to angular acceleration and angular velocity of the vehicle. In response to the angular acceleration and velocity signals direction actuating signals are generated from two pair of AND circuits connected to two OR circuits with the direction actuating signals controlling the air cushion suspension to tilt the vehicle in the proper direction when travelling a curvilinear path. There is also released an actuating signal to block the operation of the level control of the vehicle. A pendulum generates deflection signals corresponding to the direction of deflection and these deflection signals together with angular velocity signals are fed into a switching device which blocks the release of the level control blocking signals upon receiving simultaneously pendulum deflection and angular velocity signals corresponding to the same direction of curvilinear movement.

4 Claims, 3 Drawing Figures

CURVE RESPONSIVE TILT CONTROL DEVICE

The present invention relates to railway vehicles having air cushion suspension systems, more particularly, to a tilt control system responsive to a curvilinear path followed by the vehicle to actuate the air cushion suspension system to tilt the vehicle in the proper direction independently of the speed of the vehicle.

Air cushion suspension systems having a level regulator and a curvature responsive control for the heights of the cushion bellows have already been incorporated in railway vehicles. Such a system generally comprises a compressor for pumping air from the air cushion bellows on the inside of the durve to the bellows on the outside of the curve in response to curvilinear travel of the vehicle. The compressor is generally a turbo-compressor and is connected in series with the air cushion bellows on both sides of the vehicle. The compressor is driven by an electric motor whose starting, stopping and direction of rotation is controlled by contacts actuated by the swinging movement of a pendulum mounted in the vehicle. The shut-off valve is opened only while the compressor is running. The curvature responsive control mechanism comprises a pendulum mounted in the vehicle so as to swing in a plane transverse to the longitudinal direction of the vehicle. When the vehicle travels along a curve, the pendulum will swing outwardly under centrifugal force and will thus actuate contacts to start the electric motor rotating in the proper direction so that air will be pumped from the air cushion bellows on the inside of the curve to the bellows on the outside of the curve. This transfer of the air will thus decrease the height of the bellows on the inside of the curve and increase the height of the bellows on the outside. As a result of the change in height of the bellows, the vehicle body will be tilted toward the inside of the curve. The compressor will continue to deliver air to the outside bellows until either the vertical axis of the vehicle becomes parallel to the pendulum or until the maximum inclination of the vehicle body has been reached and a limit switch stops further delivery of the air.

Such a curvature responsive control device has a number of disadvantages. Since the pendulum is susceptible to swinging movement by every momentary acceleration of the vehicle produced by irregularities in the road bed or vibrations of the vehicle, it is necessary to suppress the movement of the pendulum. In order to screen out such momentary swinging movements caused by lateral vibrations of short duration it has been proposed to connect retarding members on the contacts of the pendulum to delay a signal being transmitted until after the outward swing of the pendulum continues beyond a predetermined period of time. Since with these retarding and delaying devices the compressor will not be energized until sometime after the vehicle has entered a curve, it is apparent that the tilting of the vehicle body toward the inside of the curve will be correspondingly delayed. During the elapse of time from the entry of the vehicle into the curve until the tilting begins, passengers in the vehicle will be subjected to a centrifugal force toward the outer periphery of the curve. As the vehicle leaves the curve the centrifugal force on the pendulum will decrease. However, if the tilt limiting mechanism becomes actuated before the vehicle emerges from the constant radius portion of the curve the pendulum will remain in its inclined position. Since the tilting moment exerted by the air cushion upon the vehicle body will remain constant but the centrifugal forces acting upon the vehicle body will decrease the vehicle body will tend to swing in an undesired manner toward the inside of the curve. Because of this further tilting and the subsequent decrease of the centrifugal force of the pendulum, being subjected to the delayed action, will return from its outwardly swung position to its mid-position. During this movement of the pendulum, however, there will not be any return of the vehicle body to its vertical upright position. The compressor will not begin to pump air from the outside bellows to the inside bellows in response to signals from the pendulum after the elapse of the delay time until after the pendulum, in response to a termination of the tilting of the vehicle body, swings outwardly in opposite direction. As the air is pumped back into the inside bellows, the vehicle body will be returned to its upright position. It is now apparent that the passengers who have been previously subjected to a centrifugal force toward the outside of the curve because of the limitation on the maximum tilt of the vehicle will now be subjected to a force directed toward the inside of the curve as a result of an increase in the tilt of the vehicle body as it leaves the curve. This change of direction in the centrifugal force produces disagreeable and uncomfortable effects in the passengers.

The above mentioned disadvantages and difficulties are inherent in curvature responsive control devices wherein a pendulum is employed to indicate the curvilinear path of the vehicle. For precise tilting of a railway vehicle having an air cushion suspension a gyroscope was employed as a curvature responsive device to generate an actuating signal for tilting of the vehicle as soon as the path of the vehicle changes from a straight line to a curvilinear one. At the same time, the air cushion suspension system received an actuating signal which disengaged the level regulating control for the vehicle body so as to avoid any reverse tilting of the body. The signal for actuating the tilting mechanism was stopped before the vehicle left the transitional portion of the curve and entered the constant radius portion because as the vehicle travels along a path of constant radius the centrifugal force remained constant. As the vehicle proceeded from the curve onto the straight portion of the road bed the control mechanism delivered air to the air cushion suspension system to return the vehicle body into the upright position. This actuating signal together with the signal for disengaging the level regulator of the air cushion suspension system terminated before the vehicle left a transition portion of the curve to enter a straight track. The gyroscope as a control device generated these actuating signals with the relationship to the curvilinear and rectilinear movement of the vehicle as described above and was thus satisfactory in controlling the tilting of the vehicle.

Such a tilt control system could be modified so as to be independent of the air cushion system by providing special cylinders actuated by compressed air or hydraulic fluid. Furthermore, actuating signals generated under these mentioned conditions may also be employed for controlling the coupling device of a railroad vehicle, a rotary support, or a running axle precisely in response to the curvature of the road bed.

The tilt control system utilizing a gyroscope also employed a pendulum but merely to prevent over-controlling while the vehicle traveled along a path which was only slightly curved. As the vehicle entered a curve, actuationg signals were released which tilted the vehicle toward the inside of the curve until the vertical central longitudinal plane of the vehicle returned to a position parallel to the pendulum. As soon as this condition was reached by the vehicle, the pendulum ceased the release of its actuating signal.

It has now been determined that when the vehicle reduces its speed during passage through a curve, and as a consequence, the centrifugal force acting on the rear vehicle is reduced, the tilting action in response to the control device tends to tilt the vehicle toward the inside of the curve to a much greater extent than would be desirable. Actually, under such conditions, it would be desirable to introduce a certain degree of tilting of the vehicle back toward its vertical upright position. Also, in the situation where the exit transition curve from a constant radius portion of a curve to a straight section of track has only a small variation in its radius of curvature the control device may not be sufficiently sensitive to release a measurement signal indicating angular acceleration of the vehicle. As result, the tilting forces introduced by the control device continues and effects a further tilting of the vehicle which is undesirable.

A somewhat similar unsatisfactory operation may also occur where the tilt control mechanism of the vehicle possesses a fluid system which may be slightly defective in that leaks are present. For example, if an air cushion suspension system of the vehicle is utilized as the tilting structure as described above, a slight leaking of the air spring bellows on the inside of the curve may lead to an excessively great tilting of the vehicle which would be undesirable.

It is therefore the principal object of the present invention to provide a novel and improved curve responsive device for controlling the tilting of railway vehicle provided with air cushion suspension system wherein the device is sufficiently sensitive to control the tilting of the vehicle at slow curvilinear speeds or where there is only slight variation of the radius of curvature.

It is an additional object of the present invention to provide a curve responsive tilt control device as described above which eliminates excessively great or excessively long periods of time of tilting of the vehicle toward the inside of the curve.

The objects as stated above are achieved in a curve responsive tilt control device for a railway vehicle having an air cushion suspension system and a measuring device that generates control signals while the vehicle is travelling a curvilinear path. According to one aspect of the present invention there is provided means including a gyroscope responsive to the angular velocity and angular acceleration of the vehicle about its vertical axis for delivering separate signals corresponding to the directions of the effects of said angular velocity and angular acceleration. A pendulum is suspended in the vehicle and is deflectable transversely to the direction of travel of the vehicle. Responsive to the movement of the pendulum is means for generating signals corresponding to the direction of deflection of the pendulum. Signal modulator means are connected to the signal delivering means and to the pendulum responsive means for delivering actuating signals to control the air cushion suspension to tilt the vehicle in the proper direction depending upon the direction of curvilinear travel of the vehicle and for releasing an actuating signal ($S_N$) to block the operation of the level control of the vehicle. Swiching means are connected to the signal delivering means and to the pendulum responsive means for blocking the release of the actuating signal ($S_N$) in response to receiving simultaneously a signal corresponding to the angular velocity and a signal from the pendulum responsive means indicative of a deflection of the pendulum in a direction corresponding to the direction of the angular velocity.

Further according to the present invention the deflection of the pendulum may generate first and second positive measurement signals and the angular velocity responsive means generates first and second angular velocity signals with the first signals corresponding to curvilinear travel in one direction and the second signals to curvilinear travel in the other direction. A first AND circuit receives the first angular velocity and first pendulum deflection signals and a second AND circuit receives the second angular velocity and the second deflection signals. A NOR circuit is connected to the outputs of the first and second AND circuits and a third AND circuit is connected to transmit the actuating signal ($S_N$) and to the output of the NOR circuit.

Other objects and advantages of the present invention will be apparent from the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
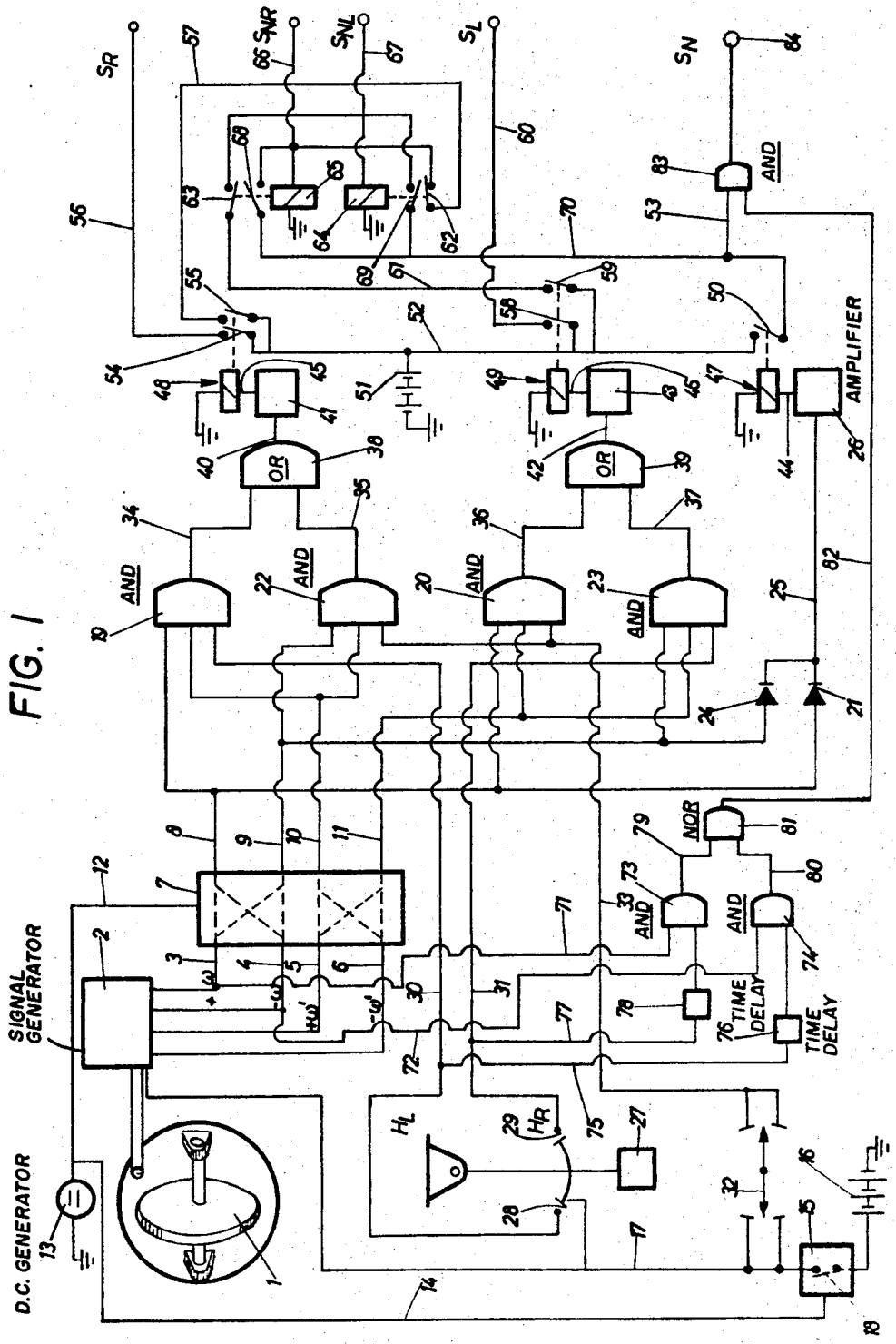
FIG. 1 is a schematic representation of the control device according to the present invention.

In FIG. 1 there is indicated at 1 an enclosed gyroscope mounted in a vehicle with its measuring axis being vertical and its axis of rotation being horizontal and transversely of the longitudinal axis of the vehicle. The gyroscope is connected to a measuring device 2 which generates two different signals $+\omega$ and $-\omega$ in response to the directions of turning movements of the vehicle about its vertical axis as indicated by the gyroscope 1. Measuring device 2 also generates angular acceleration signals $+\alpha$ and $-\alpha$ in response to the control signals generated from the gyroscope. The gyroscope 1 and measuring instrument may be those manufactured by Teldix of Heidelberg, West Germany.

The signals from measuring device 2 indicating angular acceleration and angular velocity of turning movement are transmitted by conductors 3, 4, 5 and 6 to a switching device 7 which has two switching positions and is shown in greater detail in FIG. 4. When the vehicle travels in the forward direction, switching device 7 will be in the first switching position but upon reverse movement of the vehicle the switching device will be transposed into its second switching position. In its first switching position, the signals $+\omega$, $-\omega$, $+\alpha$ and $-\alpha$ are transmitted to conductors 8, 9, 10 and 11 respectively. In the second switching position, conductors 3 and 4 which transmit signals $+\omega$ and $-\omega$ are transposed to transmit these signals to the conductors 9 and 8, respectively. In a similar manner, in the second switching position the switching device 7 transposes the connections of conductors 5 and 6 to conductors 11 and 10 respectively. The switching device 7 is controlled through conductor 12 by the polarity of a voltage generated by a D.C. generator 13 which is driven in a known manner by an axle of wheel of the vehicle.

There is an electrical lead 14 branching off from the conductor 12 to a switching device 15, which, independently of the polarity of the generated voltage, closes a switch 18 between a constant voltage source 16 and a voltage supply conductor 17 whenever the voltage lead 14 exceeds a predetermined value. Since the voltage in lead 14 depends on the r.p.m. of the D.C. generator 13, switch 18 will close only after the speed of the vehicle exceeds a certain minimum velocity. The measuring device 2 is supplied with electrical energy from the conductor 17.

The output conductor 8 of switching device 7 is connected to the input of an AND circuit 19, of another AND circuit 20 and to diode 21. The output conductor 9 from switching device 7 is connected to the input of an AND circuit 22, of a second AND circuit 23 and to a diode 24. Output conductor 10 is connected to a second input of the AND circuit 19 and to a second input of AND circuit 22. Output conductor 11 is connected to the second inputs of AND circuits 20 and 23. The diodes 21 and 24 are connected to a common conductor 25 leading to the input of a signal amplifier 26.

Mounted within the vehicle is a pendulum 27 which swings in a vertical plane transverse to the longitudinal axis or direction of travel of the vehicle. Contacts 28 and 29 are closed when engaged by the outwardly swinging pendulum. Contact 28 is closed by centrifugal force during forward movement of the vehicle along a right turn and is connected between the voltage supply conductor 17 and a conductor 30 connected to a third input of the AND circuit 19. Accordingly, upon the occurrence of an inclining or tilting force to the left of the vehicle, conductor 30 will transmit a positive measurement signal $H_L$. Contact 29 which is closed during the forward movement of the vehicle along a left turn curve connects the voltage supply conductor 17 with a lead 31 connected to the third input of the AND circuit 23. The lead 31 will thus carry a positive measurement signal $H_R$ on the occurrence of an inclining or tilting force to the right on the vehicle.

In the operation of the control system of the copending application Ser. No. 798,405 filed Feb. 11, 1969, the pendulum functions to prevent overcontrolling while the vehicle travels along paths that are only slightly curved. When the contacts are closed by the swinging pendulum, actuating signals will be generated in response to similarly directed angular acceleration and angular velocity signals only after the pendulum has swung out in the opposite direction.

A central switch 32 is provided which is responsive to the angle between the plane of the railway track and the vertical longitudinal plane of the vehicle. The switch is provided with contacts for interrupting the production of actuating signals when angular acceleration and angular velocity signals are not in the same direction during that time that the angle between the plane of the railway track and the vertical longitudinal plane of the vehicle is at a right angle. In its open position switch 32 breaks the connection of voltage supply 16 with lead 33 connected to the third inputs of the AND circuits 20 and 22 only during travel along a level road where the cushioned portion of the vehicle body is parallel to the wheel axles.

The AND circuits 19, 20, 22 and 23 have the characteristic of transmitting a voltage signal to their respective outputs 34, 35, 36 and 37 only when a signal voltage reaches all of the input terminals simultaneously. The outputs 34 and 35 of AND circuits 19 and 22 are connected to the inputs of an OR circuit 38, while the outputs 36 and 37 of the two AND circuits 20 and 23 are connected to the inputs of an OR circuit 39. The OR circuits 38 and 39 have the characteristic of transmitting a signal to their respective outputs 40 and 42 only when a signal is received by one or both of their respective inputs. The output 40 of the OR circuit 38 is connected with the input of a signal amplifier 41 and the output 42 of the OR circuits 39 is connected with the input of a signal amplifier 43. When one of the amplifiers 26, 41 or 43 receives a signal, the signal will be transmitted from its respective output 44, 45 or 46 to the coil of its respective relay 47, 48 or 49. The relay 47 which is connected to the signal amplifier 26 closes a switch 50 when energized which in turn closes the connection of lead 52 from an electric power source 51 to a conductor 53 which delivers an actuating signal $S_N$. This actuating signal is delivered only when the vehicle is turning about its vertical axis but is independent of the direction of the turn. In an air cushion suspension system having a tilt control system for the vehicle body, the actuating signal $S_N$ can be used for disconnecting or rendering inoperative the generally used level regulating means.

Relay 48 when non-energized maintains switches 54 and 55 open. Switch 54 connects lead 52 with a lead 56 for transmitting an actuating signal $S_R$ only while the vehicle is moving with an angular acceleration about a vertical axis in a predetermined direction which may be to the right. Relay switch 55 provides a connection of lead 52 with a lead 57. The relay 49 is connected to two switches 58 and 59 which are closed only when relay 49 is energized. The relay switch 58 connects lead 52 with an output conductor 60 which transmits an actuating signal $S_L$ only during movement of the vehicle with angular acceleration about a vertical axis in a direction opposite to the direction set forth above or the left. In the above described known air cushion suspension system, the actuating signals $S_R$ and $S_L$ are transmitted, to devices which will tilt the vehicle body in one direction during the continued transmission of one of such signals but will tilt the body in the other direction during the continued transmission of the other of such signals.

The relay switch 59 connects lead 52 with a conductor 61. The conductors 57 and 61 lead to contacts 62 and 63 of relays 64 and 65 respectively with these contacts being closed when the relays are non-energized.

Contact 62 is connected to an output lead 66 for an actuating signal $S_{NR}$. From contact 63 there is an output conductor 67 delivering an actuating signal $S_{NL}$. The output 66 is also connected to the coil of relay 65 with the other end of the coil being connected to ground and also connected a contact 68 which remains open while relay 65 is non-energized. Output 67 is connected in a similar manner to the coil of relay 64 with the other end of the coil being connected to ground and to a contact 69 which remains open while the relay 64 is non-energized. Contacts 68 and 69 have their other sides connected to a conductor 70 leading to output 53.

In the known air cushion suspension system, while an actuating signal $S_{NR}$ or $S_{NL}$ is generated, the air cushion which at that time is on the outside of the curve is connected to a level regulator which is controlled by only the height of the longitudinal tilt axis of the vehicle.

The electrical energy supply connection to the AND circuits 19, 20, 22 and 23, the OR circuits 38 and 39 and the signal amplifiers 26, 41 and 43 are not shown in FIG. 1, but the necessary connections can be readily made through leads 17 with voltage source 16.

The switching device according to the present invention comprises leads 71 and 72 which branch from the conductors 3 and 4 transmitting the measurement signals $+\omega$ and $-\omega$. The branch leads 71 and 72 are connected to the inputs of AND gates 73 and 74 respectively. From the lead 30 there is connected a branch lead 75 which is connected through a time delay element 76 to the second control input of AND gate 74. From the lead 31 there is connected a branch lead 77 which is similarly connected through a time delay element 78 to the second control input of AND circuit 73. The outputs of the AND circuits 73 and 74 are connected through output leads 79 and 80 to the inputs of a NOR circuit 81. The NOR circuit 81 has an output lead 82 which is connected to an input of an AND circuit 83 which is connected in the output conductor 53 which generates the actuating signal $S_N$. The AND circuit 83 releases the actuationg signal $S_N$ at output connection 84 only when positive signals appear both in the output line 53 and in line 82.

Figure 2:
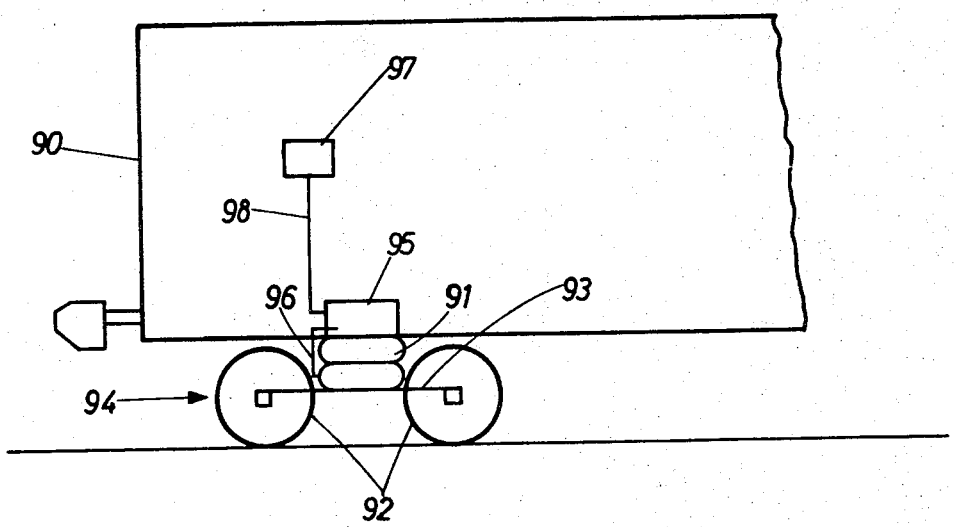
FIG. 2 is a schematic representation showing the several elements of the present invention mounted in a railway vehicle provided with an air cushion suspension system.
Figure 3:
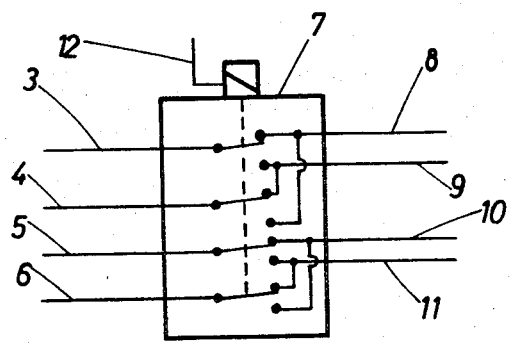
FIG. 3 is an electrical diagram showing the connections within the switching device of FIG. 1.

As may be seen in FIG. 2 a railway car has a body 90 supported upon air cushions 91 which are located under both sides of the body and are supported on a beam 93 of a pivotably mounted truck 94 having wheels 92. The beam 93 is connected without any springs to the wheel 92 as indicated in the drawings. Positioned in the vicinity of the air bellows 91 on the car body 90 is a control device 95 comprising a system of pressure observation and control in the bellows 91 and as shown in the copending application Ser. No. 808,225, now U.S. Pat. No. 3,572,747 filed on Mar. 18, 1969 by the same assignee as the present application. A compressor 28 shown in FIG. 1 of the above mentioned patent application can also be positioned in the control device 95 which can be driven by the wheel 92 in combination with a universal joint shaft such as known in accessory drives. For actuating valves 7, 8 and 43 shown in FIG. 1 of application Ser. No. 808,225 control rods 96 are employed and are positioned with respect to the beam 93 as shown in FIG. 2 of the drawings. The central switch 32 in the present application may be positioned in the control device 95 as to be actuated by the control rods 96. All of the remaining elements illustrated in FIG. 1 can then be combined in a single device 97 positioned at any point within the vehicle body 90.

It is preferable to arrange the device 97 as near as possible to the horizontal longitudinal axis of the body. The device 97 is connected with control device 95 by a cable 98 which accomodates the output circuits 56, 66, 67, 60 and 53 for the actuating signals as well as the connecting leads 17 and 33 for central switch 32.

The air cushion suspension system of a vehicle to which the control system of the present invention is directed is generally provided with a third centrally positioned level regulator to maintain the longitudinal axis of tilt of the vehicle at a constant height. The air cushion bellows of the air cushion suspension system are generally characterized by having volumes which do not increase linearly with their heights. Further, losses of air from the air cushion bellows occur during actuation of the tilting control in response to the curvature of the path. For these reasons, when the vehicle travels along a curve there will occur during the tilting of the vehicle body a lowering of the longitudinal axis about which the vehicle body is tilted. The third level regulator which is switched in when the two lateral level regulators are disconnected will deliver compressed air into only that bellows which is then at the outside of the curve to raise the longitudinal axis of tilt during the tilting of the vehicle body. The actuating signal for this third level control device is generated from a switching system which during the actuation of an actuating signal responsive to the angular acceleration and angular velocity but which during that time remains independent of the direction of turning.

During movement of the vehicle in the forward direction, switching device 7, under the influence of the corresponding polarity of the voltage produced by D.C. generator 13, will keep the leads 3 and 8, 4 and 9, 5 and 10 and also 6 and 11 connected with each other. During straight line or rectilinear travel of the vehicle no forces will be exerted on the gyroscope 1 and measuring device 2 will not deliver any signals to conductors 3–6. During such rectilinear travel pendulum 27 will remain in its mid or stationary position. Contacts 28 and 29 will remain open and there will be no voltage in leads 30 and 31. The vehicle body will be in a position parallel to the plane of the road bed so that central switch 32 will not transmit any voltage through conductor 33. As a result, no signals will be transmitted to the inputs of AND circuits 19, 20, 22 and 23 and the OR circuits 38 and 39. Relay switches 50, 54 and 58 and also 55 and 59 will keep the outputs 53, 56, 60, 66 and 67 disconnected from the voltage source 31 and no actuating signals will be delivered from the system.

As the vehicle leaves a straight portion of track A to enter a transition curve portion, the front end of the vehicle will experience an angular acceleration and also an angular velocity or movement in a direction corresponding to the direction of turning. Gyroscope 1 will thus transmit control signals to measuring device 2 which in turn will generate indicating signals $+\omega$ and $+\alpha$ into conductors 3 and 5 respectively. The leads 8 and 10 will each transmit a signal to the inputs of AND circuit 19 and AND circuit 19 in turn will transmit a signal at its output 34. None of the other AND circuits 20, 22 and 23 will receive any input signals and hence will not transmit any output signals.

The OR circuit 38 will then receive an input signal from lead 34 and will transmit a signal through its output 40 to the amplifier 41 so as to energize the coil of relay 48. The relay switches 54 and 55 will thus be closed and output 56 will be connected with the voltage source 51 and will transmit an actuating signal $S_R$. At the same time, the signal $+\omega$ which was fed by measuring device 2 into lead 3 will be transmitted through the output lead 8, across diode 21 and through conductor 25 to the signal amplifier 26 to transmit the amplified signal to relay 47 which will be energized to close the switch 50. This will connect the output lead to the voltage source 51 and an actuating signal $S_N$ will be transmitted through lead 70 to contact 68 and 69 of relay 64 and 65.

Also with the closing of relay switch 55 lead 57 will be connected to the voltage source 51 and the same voltage will be transmitted across the closed contact 62 of relay 64 to output lead 66 which will receive an actuating signal $S_{NR}$. The coil of relay 65 will be energized to open contact 63 while contact 68 will be closed. The output 66 in parallel with contact 62 will thereby be connected through contact 68, the leads 70 and relay switch 50 to voltage source 51.

As described above, a vehicle having an air cushion suspension system and a curvature responsive tilt control system may have its level regulator controlled by the actuating signals $S_N$ so that the heights of the air cushion bellows are kept constant. The actuating signal $S_R$ can effect a pumping of the air from the bellows on the right side of the vehicle into the bellows on the left side of the vehicle to gradually tilt the vehicle body to the right during the duration of actuating signal $S_R$. The actuating signal $S_{NR}$ which is responsive only to the height of the longitudinal tilting axis of the vehicle can effect a connection between the third level regulator and the air cushion bellows on the left side of the vehicle.

At the end of the transition portion the vehicle will keep its maximum angular velocity for the curve. As the vehicle enters the constant radius portion the angular acceleration will drop to zero while the angular velocity remains constant. The measuring device 2 will therefore continue to transmit the indicating signal $+\omega$ into conductor 3 to indicate a right hand turning of the vehicle body while the signal $+\alpha$ which was previously transmitted into the lead 5 will cease. The AND circuit 19 will become blocked so that no signal will be transmitted to the inputs of OR circuit 38. The OR circuit will likewise be blocked so that there will not be any output signal at its output 40 and no signal will be transmitted to relay 48 through amplifier 41. The relay switches 54 and 55 will be opened and will disconnect the output lead 56 from the voltage source 51. The output signal $S_R$ will then stop and further tilting of the vehicle body on the air cushion will be discontinued and the present angle of inclination of the vehicle body will be maintained. The output lead 53 and also the output lead 66 will remain connected with voltage source 51 and relay 65 will remain energized. The actuating signals $S_N$ and $S_R$ will therefore continue as the vehicle travels along the constant radius portion of the curve. The third level regulator can now regulate the height of the air cushion bellows on the side of the vehicle at the outside of the curve.

When the vehicle travels from the constant radius portion into the transition portion at the exit of the curve, the vehicle will experience an angular acceleration in the opposite direction from the angular acceleration experienced at the entrance to the curve. This negative or decreasing angular acceleration will in turn decrease the angular velocity of the vehicle. The gyroscope 1 will then transmit a control signal $+\omega$ into conductor 3 and a signal $-\alpha$ into the lead 6. AND circuit 20 will thus receive a signal at its inputs and will transmit an output signal at 36. The OR circuit 39 will now become conductive and through lead 42 and amplifier 43 will energize the coil of relay 49. This will close relay switches 58 and 59 to connect output lead 60 to the voltage source 51 and an actuating signal $S_L$ will be generated at the output 60.

In the air cushion suspension system, the actuating signal $S_L$ will control the delivery of air back from the air cushion bellows at the outside of the curve to the bellows at the inside of the curve. During this time the actuating signals $S_N$ and $S_{NR}$ will continue to be generated.

When the vehicle leaves the exit transition portion and travels into the straight portion of track the vehicle will no longer experience any angular velocity or angular acceleration. The measuring device 2 will then interrupt the measuring signals $+\omega$ and $-\alpha$ in the leads 3 and 6. AND circuit 20 and the serially connected OR circuit 39 will both become blocked and relay 49 will be de-enerized. Relay switches 58 and 59 will now open and will interrupt the connection of the output lead 60 with voltage source 51. This will stop the generation of the actuating signal $S_L$.

At the same time, voltage will be shut off through diode 21, lead 25 and the control input of the signal amplifier 26. Relay 47 will thus become de-energized and relay switch 50 will open. The output lead 53 will be disconnected from voltage source 51 and the actuating signals $S_N$ will be stopped. The relay 65 is thus de-energized and output lead 60 is also disconnected from the voltage source 51. This will stop the generation of the actuating signal $S_{NR}$. In the vehicle air cushion suspension system which is actuated by the control system disclosed as this invention the interruption of the actuating signals $S_L$, $S_N$ and $S_{NR}$ will stop the pumping of the air from the bellows at the outside of the curve to the bellows at the inside of the curve, will disconnect the third level regulator from the air cushion bellows at the outside of the curve, and will reestablish the normal operation of the lateral level regulating devices. If the vehicle body has not yet been brought back to its initial vertical position by this pumping back of the air, this repositioning of the vehicle body can be carried out by the lateral level regulators.

Should the speed of the vehicle be reduced as the vehicle is passing through a curve while tilted, the centrifugal force on the pendulum 27 will be correspondingly decreased and the pendulum 27 will be deflected toward the inside of the curve to close one of the contacts 28 and 29. This deflection can also be promoted by the actuation device for tilting the vehicle which is capable of increasing the tilt of the vehicle because of the reduction in centrifugal force acting on the vehicle. A measurement signal $H_L$ or $H_R$ will then appear in one of the leads 75 or 77. The signal will be transmitted after suitable delay through delay device 76 or 78 to AND circuit 74 or 73. Since a measurement signal $-\omega$ or $+\omega$ has already been supplied to the other input of AND circuit 74 or 73 over a line 72 or 71 because of the passage of the vehicle through a curve as described above, AND circuit 74 or 73 will release an output signal into output line 80 or 79. This output signal will induce NOR circuit 81 to block the signal previously being transmitted in line 82 while the leads 79 and 80 were without any signals therein. As a result, no signal will appear at the input of AND circuit 83 through lead 82 and the actuation signal $S_N$, previously appearing on the output connection 84, will be blocked. The blocking of the actuation signal at 84 will enable the customary level control device of the vehicle to become operative and to tilt the vehicle toward its upright position until closed contact 28 or 29 is opened by pendulum 27. When either contact 28 or 29 is opened no signal will appear in lead 75 or 77, there will not be any signal on the inputs of NOR member 81, and the lead 82 will again transmit a signal which will permit the release of actuating signal $S_N$ through AND circuit 83 at output 84. Thus, the actuating signal being transmitted in line 53 will no longer will be blocked in AND circuit 83 and will appear at output 84. As result, when the vehicle has been righted into its vertical upright position wherein its vertical axis is parallel to the pendulum 27, an actuating signal $S_N$ for switching off the regular level control of the vehicle will again be released.

A corresponding operating sequence will occur in the event that the vehicle should be excessively tilted as it passes through a curve because of any irregularities in the tilt actuation device of the vehicle. A similar sequence will also occur in the situation where the vehicle passes through a transition curve having only a very slight variation in the radius of curvature from a curve of constant radius to a straight line. In this situation the measurement signals $+\alpha$ or $-\alpha$ for returning the vehicle to its vertical upright position will not occur because of the gyroscope 1 will not be sufficiently sensitive to respond to this slight variation in angular acceleration. However, the measurement signals $+\omega$ and $-\omega$ will continue and together with measurement signals $H_L$ or $H_R$ generated by pendulum 27 will bring about a tilting of the vehicle to its upright position by blocking actuating signal $S_N$ so that the regular level control of the vehicle may function.

The pendulum 27, as described above, releases positive measurement signals $H_L$ and $H_R$ responsive to the deflection of the pendulum. This pendulum arrangement can be modified to interrupt or block measurement signals when the pendulum is deflected so as to in effect release negative measurement signals. With such a modified pendulum arrangement it is expedient to provide three NAND circuits in place of the AND circuits 73 and 74 as well in place of the NOR circuit 81.

The time delay element 76 and 78 are employed to eliminate measurement signals $H_L$ or $H_R$ of pendulum 27 that occur for only brief durations of time and result merely from oscillations from the pendulum because of irregularities in the road bed or normal swaying of the vehicle during its movement thereof. A time delay of about 1.0 seconds may be employed for the delay elements but it is to be understood that the time delay period may be set as desired.

The present control system can also be used for inclination or tilting control of the air cushion suspension system. The actuating signals generated by the control system can also be used for curvature responsive tilt control of a vehicle equipped with the usual leaf or coil springs by employing special cylinder and piston devices which only control the tilting of the vehicle body. The actuating signals may also be used for control the adjustment of curve axles or the turning positions of vehicles as well as for curvature controlled vehicle couplings.

Where the device according to the present invention releases positive measurement signals in response to the deflection of the pendulum these signals may be combined or coordinated with each other, i.e., such as $+\omega$ and $H_R$ as well as $-\omega$ and $H_L$ so that the measurement signals for angular velocity and for pendulum deflection are transmitted over an AND circuit and combined to an NOR circuit whose output is connected to the input of an AND circuit connected to the output line of actuation signal $S_N$ where this actuation signal is for blocking the operation of the level control of the vehicle.

In a similar manner, where the deflection of the pendulum releases negative measurement signals, as described above, the signals responsive to angular velocity and deflection of the pendulum, namely $+\omega$ and $H_R$ as well as $-\omega$ and $H_L$, may be introduced into two NAND circuits whose outputs are connected over a third NAND circuit to the input of an AND circuit connected in the output line of actuation signal $S_N$.

It is therefore apparent that the present invention provides for the pendulum to operate in addition to its monitoring function, to permit the regular level control of the vehicle to become effective where there is a excessively great tilting of the vehicle toward the interior of the curve. This regular level control functions until the vehicle is returned to its upright position so that the vertical axis of the vehicle is parallel to the pendulum Any tilting of the vehicle beyond its vertical upright position is therefore avoided. In addition, the vehicle can be returned to its vertical upright position when the vehicle is travelling along a curved portion having such a small variation in its radius of curvature that the control device is not sufficiently sensitive to release measurement signals responsive to angular acceleration. In this situation, the regular level control of the vehicle will again function to tilt the vehicle back toward its upright position.

It is understood that this invention is susceptible to modification in order to adapt it to different usages and conditions and, accordingly, it is desired to comprehend such modifications within the invention as may fall within the scope of the appended claims.

What is claimed is:

1. In a curve responsive tilt control device for a railway vehicle having an air cushion suspension system and a measuring device that generates control signals while the vehicle is travelling a curvilinear path, the combination of means responsive to the angular velocity and angular acceleration of the vehicle about its vertical axis for delivering separate signals corresponding to the directions of the effects of said angular velocity and angular acceleration, a pendulum suspended in the vehicle and deflectable transversely to the direction of travel of the vehicle, means responsive to the deflection of said pendulum for generating signals corresponding to the direction of deflection of said pendulum, signal modulator means connected to said signal delivering means and said pendulum responsive means for delivering actuating signals to control the air cushion suspension to tilt the vehicle in the proper direction depending upon the direction of curvilinear travel of the vehicle and for releasing an actuating signal ($S_N$) to block the operation of the level control of the vehicle, and switching means connected to said signal delivering means and said pendulum responsive means for blocking the release of said actuating signal ($S_N$) in response to receiving simultaneously a signal corresponding to angular velocity and signal from said pendulum responsive means indicative of a deflection of the pendulum in a direction corresponding to the direction of the angular velocity.

2. In a curve responsive tilt control as claimed in claim 1 wherein the deflection of the pendulum generates first and second positive measurement signals and said angular velocity responsive means generates first and second angular velocity signals, the first signals corresponding to curvilinear travel in one direction and the second signals to curvilinear travel in the other direction, a first AND circuit receiving the first angular velocity signal and the first pendulum deflection signal, a second AND circuit receiving the second angular velocity signal and the second pendulum deflection signal, a NOR circuit connected to the output of said first and second AND circuits, and third AND circuit connected to transmit said actuating signal ($S_N$) and to the output of said NOR circuit.

3. In a curve responsive tilt control device as claimed in claim 1 wherein the deflection of the pendulum generates first and second negative measurement signals and said angular velocity responsive means generates first and second angular velocity signals, the first signals corresponding to curvilinear travel in one direction and the second signals to curvilinear travel in the other direction, a first NAND circuit circuit receiving the combined first signals and a second NAND circuit receiving the combined second signals, a third NAND circuit connected to the outputs of said first and second NAND circuits, and AND an circuit connected to transmit the actuating signal ($S_N$) and to the output of said third NAND circuit.

4. In a curve responsive tilt control device as claimed in claim 2 and comprising time delay means connected to said pendulum signal generating means for transmitting only those deflection signals which persist longer than a predetermined duration of time.

* * * * *